US012441067B2

(12) United States Patent
Kahya et al.

(10) Patent No.: US 12,441,067 B2
(45) Date of Patent: Oct. 14, 2025

(54) WELDING SYSTEM

(71) Applicant: TUSAS—TURK HAVACILIK VE UZAY SANAYII ANONIM SIRKETI, Ankara (TR)

(72) Inventors: Muge Kahya, Ankara (TR); Yakup Bay, Ankara (TR); Mete Bakir, Ankara (TR)

(73) Assignee: TUSAS- TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 206 days.

(21) Appl. No.: 18/268,348

(22) PCT Filed: May 25, 2021

(86) PCT No.: PCT/TR2021/050482
§ 371 (c)(1),
(2) Date: Jun. 20, 2023

(87) PCT Pub. No.: WO2022/146284
PCT Pub. Date: Jul. 7, 2022

(65) Prior Publication Data
US 2024/0034007 A1 Feb. 1, 2024

(30) Foreign Application Priority Data
Dec. 30, 2020 (TR) .................. 2020/22367

(51) Int. Cl.
*B29C 70/34* (2006.01)
*B29C 65/20* (2006.01)

(52) U.S. Cl.
CPC ............ *B29C 70/345* (2013.01); *B29C 65/20* (2013.01)

(58) Field of Classification Search
None
See application file for complete search history.

(56) References Cited

U.S. PATENT DOCUMENTS 5,538,590 A 7/1996 Riley
2017/0274578 A1* 9/2017 Sigrist .................. B29C 66/876

FOREIGN PATENT DOCUMENTS

DE 1253904 B 11/1967
GB 2166330 A 4/1986
WO 2018019809 A1 2/2018

OTHER PUBLICATIONS

Machine English translation of WO2018019809, Accessed Mar. 12, 2025 (Year: 2018).*

(Continued)

*Primary Examiner* — Abbas Rashid
*Assistant Examiner* — Adrianna N Konves
(74) *Attorney, Agent, or Firm* — Notaro, Michalos & Zaccaria P.C.

(57) ABSTRACT

A welding system has a lay-up surface, resin fabrics laid side by side and/or on top of each other on the lay-up surface, at least one welding apparatus enabling the resin fabrics to be joined to each other by means of heat after they are brought into contact with each other, and at least one compression plate detachably attached onto the lay-up surface, applying pressure to the resin fabrics, thereby almost completely preventing the sliding and/or wrinkling of the resin fabrics.

14 Claims, 2 Drawing Sheets

(56) References Cited

OTHER PUBLICATIONS

Gardner, Ginger; "Welding thermoplastic composites"; Composites World Sep. 30, 2018; 30:50-63.
International Search Report and Written Opinion for PCT application No. PCT/TR2021/050482, mailed Jun. 13, 2022.
International Preliminary Report on Patentability, completed Jan. 23, 2023.
Demand/Request for Preliminary Examination dated Oct. 21, 2022.
International Application Status Report generated May 29, 2023.

* cited by examiner

WELDING SYSTEM

FIELD

The present invention relates to joining thermoplastic-based fabrics using a lay-up and consolidation process thereof.

BACKGROUND

Thermoplastic composites are differentiated from conventional thermoset composites by their ability to change shape under the influence of heat based on their chemical properties. Thanks to these properties thereof, they can be produced with fast production methods suitable for mass production. In addition, the fact that they have the same mechanical strength with thermoset composites despite their low density provides fuel saving in the long term. Thermoplastic composites therefore offer a considerable potential for increasing the production capacity of primary and secondary structural elements for the aviation sector. For aviation applications involving primary and secondary load-carrying structural elements, thermoplastic resins need to be reinforced with the necessary amount of carbon fibers and thus the products to be obtained need to be improved in terms of mechanical strength.

Thermoplastic fabric is a material formed as a result of resin impregnation/coating on woven and/or unidirectional lined up fibers by certain methods. Thermoplastic composites can be easily and quickly shaped under temperature and pressure between male and female molds generally using a hydraulic press in a thermoforming process without requiring long-lasting thermal curing in an autoclave. And for obtaining thermoplastic plates, a consolidation process is used. The consolidation process is a method of obtaining plates, wherein a large number of thermoplastic fabrics laid up in certain layup directions and in a certain stacking order is easily integrated under temperature and pressure between male and female flat molds generally using a hydraulic press. The thickness and size of the plates obtained by consolidating the fabrics are determined by considering the parameters of the downstream thermoforming process and the requirements of the target product part. In the consolidation process, the fabrics must be consolidated with each other in such a way that no structural gaps (porosities) are formed in between. Unlike conventional thermoset fabrics, thermoplastic fabrics do not have an adhesive structure at room temperature. For this reason, the layup of thermoplastic fabrics cannot be done as easily as conventional thermoset fabrics. There may be operator-induced errors, as well as hot and cold areas that occur consecutively create residual stress. Thus, wrinkles, folds and undulations occur on the fabric before consolidation. Eliminating these problems in the current manual lay-up systems is critical to minimize production errors in terms of subjecting thermoplastic composites to high-capacity mass production.

I In the published article titled: "Welding thermoplastic composites" by Ginger GARDINER, (COMPOSITESWORLD, vol. September 2018, 30 Sep. 2018 (2018 Sep. 30), pages 50-63, XP055588719) welding of thermoplastic materials is disclosed. It is stated in the document that resin fabrics are laid side by side and/or on top of each other on a lay-up surface and the resin fabrics are joined to each other by means of heat after they are brought into contact with each other.

The Japanese patent document JP4849627, which is included in the known state of the art, mentions on performing welding seams on thermoplastic plates laid side by side and on the ability of making welding seams for large thermoplastic plates using high frequencies applied at different values along the electrode plate.

The Japanese patent document JPH08118473, which is included in the known state of the art, mentions on performing welding on thermoplastic fabrics along a II-II line thanks to a heating zone. The dimensions of the nichrome band used for heating can be changed and adjusted in compliance with the joined fabric area.

The Great Britain patent document GB658258, which is included in the known state of the art, mentions on a method for welding thermoplastic products and a device enabling continuous welding to be performed in defined areas. By means of electrical heating current passed through a metal strip and pressure, the thermoplastic plates are joined to each other. The metal strip raised with a foot pedal can be rotated on a table. The metal strip can be in the form of a square, circle or another cross-section and can be bent according to the required shape.

Turkish patent document TR201922452, which is included in the known state of the art, fabrics are prevented from slipping using recesses or protrusions called aligners and positioners, which are compatible with each other on sheets and fabrics during the application of a preheater used for connecting fabrics to each other throughout a continuous region.

The United States patent document U.S. Pat. No. 4,978,825, which is included in the known state of the art, mentions on arms enabling the carrying of heat-producing devices for making continuous welding to thermoplastic fabrics.

Thanks to a welding system developed by the present invention, it is ensured that operator-induced errors occurring during the heat joining of thermoplastic-based fabrics and residual stresses emerging from the formation of successive temperature zones are prevented.

Another object of this invention is to prevent the formation of wrinkles, folds and undulations that may occur on the fabric prior to the consolidation process.

SUMMARY

A further object of this invention is to perform the welding of thermoplastic-based fabrics more efficiently, effectively and quickly.

A welding system realized to achieve the object of the invention, as defined in the first claim and in the claims dependent thereon, comprises a lay-up surface, resin fabrics placed side by side and/or on top of each other on the lay-up surface, at least one welding apparatus enabling the resin fabrics to be joined to each other by means of heat after they are brought into contact with each other, and at least one compression plate detachably attached onto the lay-up surface, applying pressure to the resin fabrics, thereby almost completely preventing the sliding and/or wrinkling of the resin fabrics. Resin fabrics laid side by side and/or on top of each other are joined by curing under heat.

The welding system according to the invention comprises at least one opening on the compression plate, suitable for placing a welding apparatus and surrounding the welding apparatus placed therein.

In an embodiment of the invention, the welding system comprises an opening on the compression plate that is almost entirely form-compatible with the welding apparatus.

In an embodiment of the invention, the welding system comprises more than one opening on the compression plate in different directions, enabling to join the resin fabrics with different lay-up angles by means of the welding apparatus.

In an embodiment of the invention, the welding system comprises at least one arm enabling the compression plate to be moved by an operator on the lay-up surface.

In an embodiment of the invention, the welding system comprises at least one robotic arm enabling the compression plate to be moved automatically on the lay-up surface.

In an embodiment of the invention, the welding system comprises at least one control unit enabling the robotic arm to be controlled by a user.

In an embodiment of the invention, the welding system comprises at least one female positioner on the compression plate enabling the compression plate to be placed on the lay-up surface, and at least one male positioner located on the lay-up surface so as to be engaged to each other with the female positioner.

In an embodiment of the invention, the welding system comprises a female positioner located sequentially on the compression plate, thereby enabling the compression plate to be moved on the resin fabric at user-designated intervals.

In an embodiment of the invention, the welding system comprises a female positioner in the form of a recess and/or protrusion on the compression plate, and a male positioner in the form of a protrusion if the female positioner is in the form of a recess or in the form of a recess if the female positioner is in the form of a protrusion.

In an embodiment of the invention, the welding system comprises more than one mutually-positioned male positioners located on the lay-up surface.

In an embodiment of the invention, the welding system comprises a lay-up surface that has almost a "U" form, thereby preventing the slipping of user-laid resin fabrics.

In an embodiment of the invention, the welding system comprises a resin fabric manufactured as a thermoplastic or thermoset.

In an embodiment of the invention, the welding system comprises a welding apparatus enabling the joining of resin fabrics by means of butt welding method.

In an embodiment of the invention, the welding system comprises a welding apparatus such that its temperature can be maintained at a user predetermined temperature, thereby almost completely preventing the deformation of high-temperature welded material.

In an embodiment of the invention, the welding system comprises a resin fabric almost entirely form-compatible with the lay-up surface.

BRIEF DESCRIPTION OF THE DRAWINGS

The welding system realized to achieve the object of the present invention is shown in the attached figures, wherein from these figures.

DETAILED DESCRIPTION

Figure 1:
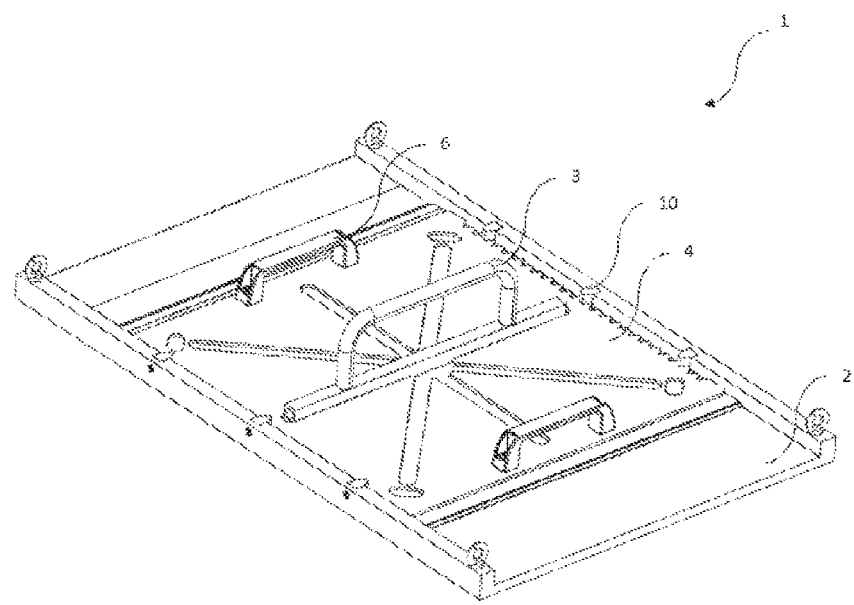
FIG. 1 is a schematic view of the welding system.

The parts illustrated in figures are individually assigned a reference numeral and the corresponding terms of these numbers are listed below.
1. Welding system
2. Lay-up surface
3. Welding apparatus
4. Compression plate
5. Opening
6. Arm
7. Robotic arm
8. Control unit
9. Female positioner
10. Male positioner
(K) Resin fabric The welding system (1) comprises a lay-up surface (2), resin fabrics (K) laid side by side and/or on top of each other on the lay-up surface (2), at least one welding apparatus (3) enabling the resin fabrics (K) to be joined to each other by means of heat after they are brought into contact with each other, and at least one compression plate (4) detachably attached onto the lay-up surface (2), applying pressure to the resin fabrics (K), thereby almost completely preventing the sliding and/or wrinkling of the resin fabrics (K). (FIG. 1)

Figure 2:
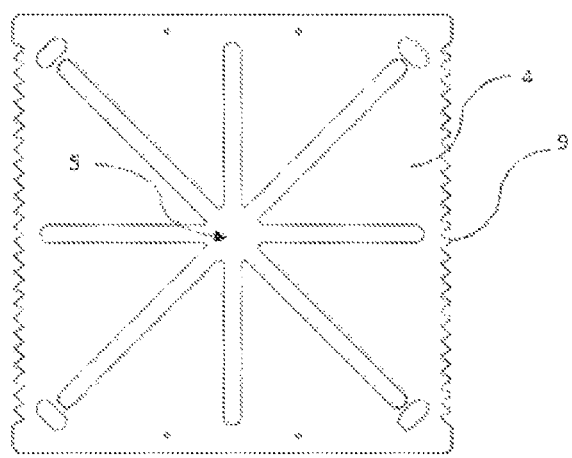
FIG. 2 is a schematic view of the compression plate.

The welding system (1) according to the invention comprises at least one opening (5) located on the compression plate (4), suitable for placing a welding apparatus (3) and surrounding the welding apparatus (3) placed therein. (FIG. 2) Resin fabrics (K) to be welded are laid on the lay-up surface (2). Resin fabrics (K) laid on top of each other and/or side by side on the lay-up surface are joined with heat under pressure by means of the welding apparatus (3). The compression plate (4) prevents the sliding of the resin fabrics (K) laid on the lay-up surface (2).

Resin fabrics (K) are hand-laid up on the lay-up surface (2). The sliding of the resin fabrics (K) is prevented by restricting their movement thanks to the compression plate (4) detachably attached onto the lay-up surface (2) in a form-compatible manner. There are openings (5) on the compression plate (4) in which the welding apparatus (3) can be placed. Thanks to these openings (5), the heat joining of the resin fabrics (K) laid on the lay-up surface (2) in 0°-45°-90° directions will be carried out without the need for the operator to position the compression plate (3) at different angles. In addition, the fact that the welding apparatus (3) is located within the borders of the opening (5) prevents errors such as sliding and undulation that may arise from the operator.

In an embodiment of the invention, the welding system (1) comprises an opening (5) located on the compression plate (4) that is almost entirely form-compatible with the welding apparatus (3). Resin fabrics (K) are joined by means of the welding apparatus (3) that can be placed into the opening (5). The welding apparatus (3) can be fully placed within 0° and 90° openings (5) and moved within 45° openings (5).

In an embodiment of the invention, the welding system (1) comprises more than one opening (5) on the compression plate (4) extending in different directions, enabling to join the resin fabrics (K) with different lay-up angles by means of the welding apparatus (3). The heat joining of the resin fabrics (K) laid on the lay-up surface (2) in a stacked manner in 0°-45°-90° directions is easily enabled thanks to the openings (5).

In an embodiment of the invention, the welding system (1) comprises at least one arm (6) enabling the compression plate (4) to be moved by the operator on the lay-up surface (2). The arms (8) on the compression plate (4) provide ease of carrying and operation to the operator.

Figure 4:
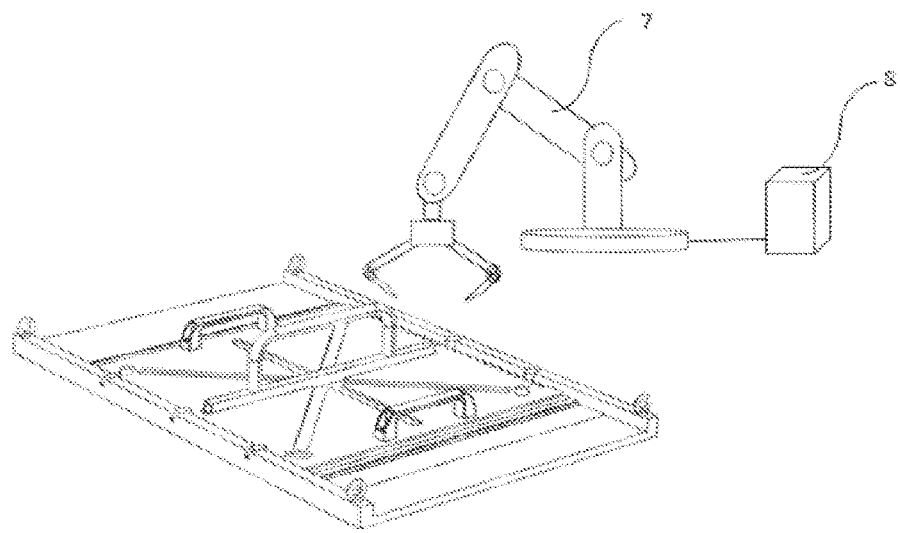
FIG. 4 is a schematic view of the welding system and robotic arm.

In an embodiment of the invention, the welding system (1) comprises at least one robotic arm (7) enabling the compression plate (4) to be moved automatically on the lay-up surface (2). Thanks to the movement of the compression plate (4) by the robotic arm (7), it is ensured that the operation is carried out automatically without the need for an operator. (FIG. 4)

In an embodiment of the invention, the welding system (1) comprises at least one control unit (8) enabling the robotic arm (7) to be controlled by the user. In this way, a production in accordance with the standards predetermined by the user is provided by using the robotic arm (7). (FIG. 4)

In an embodiment of the invention, the welding system (1) comprises at least one female positioner (9) located on the compression plate (4), enabling the compression plate (4) to be placed on the lay-up surface (2), and at least one male positioner (10) located on the lay-up surface (2), which is form-compatible so as to be engaged to the female positioner (9). Thanks to the female positioner (9) and the male positioner (10), the compression plate (4) is placed on the lay-up surface (2) and the sliding and/or wrinkling of the resin fabric (K) is prevented. It also enables the compression plate (4) to be moved forward on the lay-up surface (2) at distances desired by the user.

In an embodiment of the invention, the welding system (1) comprises a female positioner (9) located sequentially on the compression plate (4), thereby enabling the compression plate (4) to be moved on the resin fabric (K) at user-designated intervals. It enables the compression plate (4) to be moved forward on the resin fabric (K) at certain distances in accordance with the stacking sequences.

In an embodiment of the invention, the welding system (1) comprises a female positioner (9) located as a recess and/or protrusion on the compression plate (4), and a male positioner (10) which is form-compatible so as to be a recess if the female positioner (9) is a protrusion or a protrusion if the female positioner is a recess.

In an embodiment of the invention, the welding system (1) comprises more than one mutually positioned male positioners (10) on the lay-up surface (2).

Figure 3:
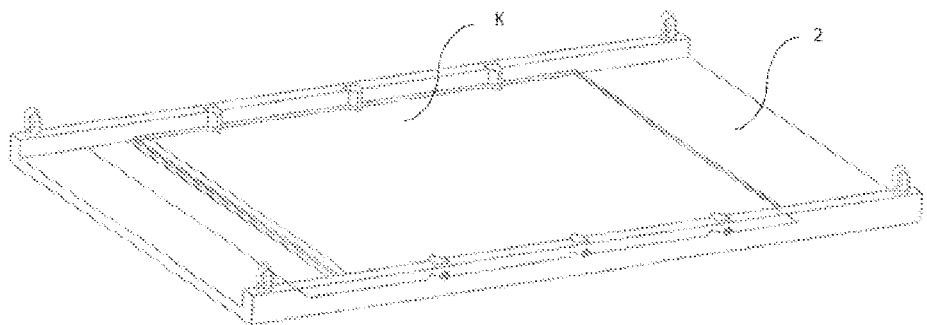
FIG. 3 is a schematic view of the lay-up surface.

In an embodiment of the invention, the welding system (1) comprises a lay-up surface (2) having almost a "U" form, thereby preventing the slipping of user-laid resin fabrics (K). Thanks to the side walls of the lay-up surface (2), the sliding of the resin fabrics (K) over the lay-up surface (2) is prevented. (FIG. 3)

In an embodiment of the invention, the welding system (1) comprises a resin fabric (K) produced as a thermoplastic or thermoset.

In an embodiment of the invention, the welding system (1) comprises a welding apparatus (3) enabling the joining of resin fabrics (K) by means of butt welding method.

In an embodiment of the invention, the welding system (1) comprises a welding apparatus (3) such that its temperature can be maintained at a user predetermined temperature, thereby almost completely preventing the deformation of high-temperature welded material. With the temperature control of the welding apparatus (3), the required temperature value for welding is precisely obtained and welding is ensured in a single operation. In addition, deformation of material due to high temperature is prevented.

In an embodiment of the invention, the welding system (1) comprises a resin fabric (K) almost entirely form-compatible with the lay-up surface (2). Resin fabrics (K) with a size larger than the lay-up surface (2) are cut so that they can be laid on the lay-up surface (2).

The invention claimed is:
1. A welding system (1) comprising:
   a lay-up surface (2),
   resin fabrics (K) laid side by side and/or on top of each other on the lay-up surface (2),
   at least one welding apparatus (3) enabling the resin fabrics (K) to be joined to each other by heat after they are brought into contact with each other,
   at least one compression plate (4) detachably attached onto the lay-up surface (2), applying pressure to the resin fabrics (K), thereby preventing sliding and/or wrinkling of the resin fabrics (K),
   at least one opening (5) located on the compression plate (4), suitable for placing a welding apparatus (3) therein and surrounding the welding apparatus (3) placed therein; and
   more than one opening (5) on the compression plate (4) extending in different directions, enabling to join the resin fabrics (K) with different lay-up angles by the welding apparatus (3).

2. The welding system (1) as claimed in claim 1, wherein the opening (5) located on the compression plate (4) is form-compatible with the welding apparatus (3).

3. The welding system (1) as claimed in claim 1, comprising at least one arm (6) enabling the compression plate (4) to be moved by an operator on the lay-up surface (2).

4. The welding system (1) as claimed in claim 1, comprising at least one robotic arm (7) enabling the compression plate (4) to be moved automatically on the lay-up surface (2).

5. The welding system (1) as claimed in claim 4, comprising at least one control unit (8) enabling the robotic arm (7) to be controlled by a user.

6. The welding system (1) as claimed in claim 1, comprising at least one female positioner (9) located on the compression plate (4), enabling the compression plate (4) to be placed on the lay-up surface (2), and at least one male positioner (10) located on the lay-up surface (2), being form-compatible with the female positioner so as to be engaged to the female positioner (9).

7. The welding system (1) as claimed in claim 6, wherein the female positioner (9) is located sequentially on the compression plate (4) and enables the compression plate (4) to be moved on the resin fabrics (K) at user-designated intervals.

8. The welding system (1) as claimed in claim 6, wherein the female positioner (9) is located as a recess and/or protrusion on the compression plate (4), and that the male positioner (10) is form-compatible so as to be a recess if the female positioner (9) is a protrusion or a protrusion if the female positioner is a recess.

9. The welding system (1) as claimed in claim 6, comprising more than one mutually positioned male positioners (10) on the lay-up surface (2).

10. The welding system (1) as claimed in claim 1, wherein the lay-up surface (2) has a "U" form, thereby preventing the slipping of user-laid resin fabrics (K).

11. The welding system (1) as claimed in claim 1, wherein the resin fabrics (K) are produced as a thermoplastic or thermoset.

12. The welding system (1) as claimed in claim 1, wherein the welding apparatus (3) enables the joining of resin fabrics (K) by a butt welding method.

13. The welding system (1) as claimed in claim 1, wherein the temperature of the welding apparatus (3) can be maintained at a user predetermined temperature such that the deformation of high-temperature welded material is prevented.

14. The welding system (1) as claimed in claim 1, wherein the resin fabrics (K) are form-compatible with the lay-up surface (2).

\* \* \* \* \*